United States Patent

[11] 3,597,056

| | | |
|---|---|---|
| [72] | Inventor | Kenji Sasaki<br>Suwa-shi, Japan |
| [21] | Appl. No. | 841,491 |
| [22] | Filed | July 14, 1969 |
| [45] | Patented | Aug. 3, 1971 |
| [73] | Assignee | Sankyo Kogaku Kogyo Kabushiki-Kaisha<br>Suwa-shi, Nagono-ken, Japan |
| [32] | Priority | May 22, 1969 |
| [33] | | Japan |
| [31] | | 44/39,788 |

[54] FILM MOVEMENT EQUALIZING DEVICE FOR A MOTION PICTURE SOUND PROJECTOR
7 Claims, 7 Drawing Figs.

[52] U.S. Cl. .................................................. 352/02
[51] Int. Cl. ............................................. G03b 31/02
[50] Field of Search ........................................ 352/12-
—14, 21, 26—30, 159; 226/36

[56] References Cited
UNITED STATES PATENTS

| | | | |
|---|---|---|---|
| 1,912,892 | 6/1933 | Eitzen ............................ | 352/14 X |
| 3,200,407 | 8/1965 | Nordin .......................... | 352/14 |
| 3,200,408 | 8/1965 | Nordin .......................... | 352/14 |
| 3,233,958 | 2/1966 | Kaess et al. .................... | 352/21 X |
| 3,244,469 | 4/1966 | Hennessey et al. ............. | 352/14 |

*Primary Examiner*—S Clement Swisher
*Attorney*—McGlew and Toren

ABSTRACT: A shutter shaft operates film advance means for moving the film past a film gate, and has two pulleys, of different diameters, secured thereto in juxtaposed relation. The pulleys are belt-driven from a small drive pulley on the output shaft of an electric motor, and a solenoid-operated shifter is engaged with the belt to shift the latter between the two differing diameter pulleys. When the belt is engaged with the smaller diameter pulley, the shutter shaft is rotated at 0.5 r.p.m. higher than the average r.p.m. and, when the belt is engaged with the larger diameter pulley, the shutter shaft is rotated at 0.5 r.p.m. lower than the average r.p.m. The motor output shaft contains a drive pulley connected by a belt drive to a flywheel driving a capstan for advancing the film through a sound reproducing section. A film loop is formed between the film gate and the sound reproducing section and a loop size detector is pivotally mounted to engage the film loop. The detector includes an obturator positioned to control the light incident upon a photoelectric transducer in accordance with the size of the film loop. The solenoid operating the belt shifter is controlled by an electric circuit including the photoelectric transducer. In one embodiment, the film may be advanced past a film gate in either a normal direction or a reverse direction, and the loop size detector is conditioned to operate with both directions of film advance, by cam means associated with a shaft controlling a switch which, in turn, controls the direction of operation of the film-driving motor.

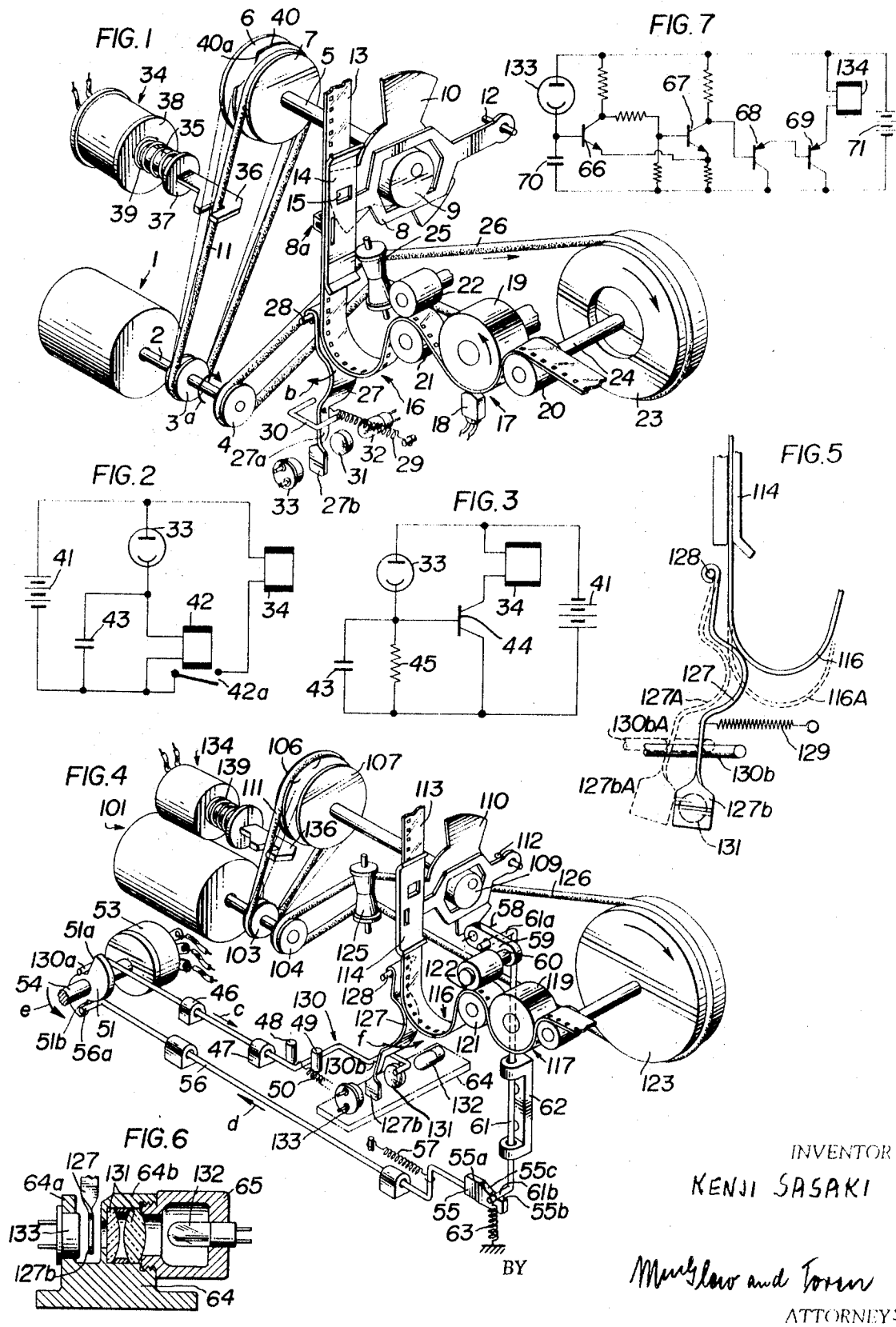

FILM MOVEMENT EQUALIZING DEVICE FOR A MOTION PICTURE SOUND PROJECTOR

SUMMARY OF THE INVENTION

The present invention relates to film movement rate equalizing devices for a sound projector. In particular, the invention is concerned with a film movement rate equalizing device for a sound projector in which film is advanced in the film gate of the sound projector at two different rates, one rate being slightly higher and the other rate being slightly lower than the rate of film movement in the sound reproducing section of the sound projector, and differences in film movement rate are detected by novel detection means in conformity with fluctuations in the size of film loop so as to switch the film movement rate in the film gate between the two rates, whereby the average film movement rate in the film gate and the film movement rate in the sound reproducing section can be substantially equalized.

The movie film with which a projector provided with a sound reproducing system is loaded is intermittently advanced by a film advance pawl in the film gate interposed between the light source and projection lens. The film is continuously advanced by friction feed means at a constant rate in the sound reproducing section in which the sound recorded in the sound track is converted into electric signals. To attain good sound quality in screening sound films, it is essential that the average rate of movement of the film intermittently advanced in the film gate and the rate of movement of the film advanced continuously in the sound reproducing section be kept equal to each other, with a predetermined number of frames being maintained between the film gate and sound reproducing section. However, the film advance device for movie projectors is constructed such that it is very difficult to advance the film in such a manner as to keep the average rate of movement of film in the film gate and the rate of movement of film in the sound reproducing section equal to each other at all times. That is, it is practically impossible to keep the rate of movement of the film, intermittently advanced by the film advance pawl in the film gate, and the rate of movement of the film, continuously advanced by friction means in the sound reproducing section, equal to each other from the beginning to the end of the run of film. Therefore, it would be useless to provide the film gate and sound reproducing section with film advance means constructed and adjusted to operate precisely and accurately in order to maintain the rate of film movement in the former equal to the rate of film movement in the latter. It would be more advantageous to design and construct a film advance pawl operating mechanism such that the film can be advanced in the film gate at two different rates, one slightly higher and the other slightly lower than the rate of film movement in the sound reproducing section, so that the average rate of movement of film in the film gate can be made equal to the rate of movement of film in the sound reproducing section, by increasing or reducing the rate of movement of the film advanced by the pawl depending on differences in the rate of movement of film between the two sections. More specifically, the rate of movement of the film advanced continuously by the friction wheel means in the sound reproducing section may, for example, be set at 18 frames per second and the average rate of movement of the film in the film gate may be set at 17.5 frames per second and 18.5 frames per second. If the film is advanced by the pawl at the rate of 17.5 frames per second to start with, the film loop formed between the film gate and sound reproducing section will be gradually reduced in size. If this fluctuation in the size of the film loop is detected and the rate of movement of the film advanced by the pawl is increased to 18.5 frames per second, the film loop, which has grown smaller in size, will be restored to its original size and begin to grow larger than the original size. If this fluctuation in the size of the film loop is detected and the rate of movement of the film advanced by the pawl is reduced to 17.5 frames per second, the film loop will grow smaller in size again till it is restored to its original size. If this cycle of operation is repeated, it will be possible to maintain the average rate of movement of the film in the film gate at 18 frames per second by detecting fluctuations in the size of the film loop caused by variations in the rate of operation of the film advance pawl.

Accordingly, an object of the present invention is to provide a film movement rate equalizing device for a sound projector in which film is advanced by film advance means in the film gate at two different rates, one rate being slightly higher and the other rate being slightly lower than the rate of film movement in the sound reproducing section, and differences in film movement rate are detected by detection means associated with signal producing means in conformity with fluctuations in the size of a film loop so as to switch the film movement rate in the film gate between the two rates by film advance rate switch means, whereby the average film movement rate in the film gate and the film movement rate in the sound reproducing section can be substantially equalized.

Another object of the invention is to provide a film movement rate equalizing device for a sound projector in which the detection means, used for detecting differences between the film movement rate in the film gate and the film movement rate in the sound reproducing section, is pivotally supported at its upper end behind the film loop and includes an intermediate portion curved forwardly toward the front end of the projector and a lower end portion which serves as a light path opening and closing portion or obturator, the detection means being pivotally moved in conformity with fluctuations in the size of the film loop to actuate the signal producing means for operating the film advance rate switch means.

Still another object of the invention is to provide a film movement rate equalizing device for a sound projector in which the film advance rate switch means includes two pulleys mounted on a shutter shaft, one pulley having a larger diameter than the other pulley, and a belt driven by an electric motor and switched alternately between the two pulleys so as to thereby advance film at two different rates in the film gate.

Still another object of the invention is to provide a film movement equalizing device in which film movement direction switch means is associated with stop means for causing the range of pivotal movement of the detection means to be displaced in a direction transversely of the light path of the signal producing means, whereby equalizing of the rate of film movement in the film gate and the rate of film movement in the sound reproducing section can be effected not only when the film is advanced in the normal direction but also when it is advanced in the reverse direction.

A further object of the invention is to provide a film movement rate equalizing device for a sound projector in which film movement direction means is associated with the signal producing means, and is adapted to move substantially in the same direction as the pivotal movement of the detection means, whereby equalizing of the rate of film movement in the film gate and the rate of film movement in the sound reproducing section can be effected not only when the film is advanced in the normal direction but also when it is advanced in the reverse direction.

BRIEF DESCRIPTION OF THE DRAWINGS

Additional objects as well as features and advantages of the present invention will become apparent from the description set forth hereinafter when considered in conjunction with the accompanying drawings, in which:

FIG. 1 is a schematic view of one embodiment of a sound projector incorporating the film movement rate equalizing device according to this invention, with the projection lens and other elements unnecessary for the explanation of the present invention being omitted;

FIG. 2 is a schematic wiring diagram showing one example of the electric circuit used in the device according to this invention;

FIG. 3 is a schematic wiring diagram showing another example of the electric circuit used in the device according to this invention;

FIG. 4 is a schematic view of another embodiment of sound projector incorporating the film movement rate equalizing device according to this invention, and which permits to effect equalizing of the rates of film movement not only when the film is advanced in the normal direction but also when it is advanced in the reverse direction;

FIG. 5 is a side view, on an enlarged scale, of detection means used with the projector illustrated in FIG. 4;

FIG. 6 is a sectional view, on an enlarged scale, of signal producing means for the embodiment of FIG. 4 assembled for movement as a unit in conformity with fluctuations in the size of film loop; and FIG. 7 is a schematic wiring diagram of one example of the electric circuit used with the projector illustrated in FIG. 4.

DESCRIPTION OF THE PREFERRED EMBODIMENTS

In FIG. 1, an electric motor 1 has a rotary shaft 2 to which are firmly fixed relatively small pulleys 3 and 4 of substantially equal diameter. The shaft 2 is adapted to rotate at a constant rate in the direction of arrow a. The electric motor 1 is mounted in a suitable position in the body of a projector (not shown). A shutter shaft 5 rotatably supported in the body of the projector has pulleys 6 and 7 of different diameters firmly fixed to one end thereof, and an eccentric cam 9 and a shutter plate 10 at the other end thereof, eccentric cam 9 being adapted to oscillate a film advance pawl 8. The shutter shaft 5 is driven by an endless belt 11 of circular section trained over the pulleys 3 and 7. The film advance pawl 8 is pivotally mounted at its base on a fixed part of the projector, through a pin 12. When the shutter shaft 5 rotates, the film advance pawl 8 intermittently advances a film 13 downwardly by its forward end 8a as seen in the figure. The film advance device, comprising the eccentric cam 9 and film advance pawl 8, is well known in conventional projectors of the small type. The size of pulleys 6 and 7 is determined such that, when the belt 11 is trained about the pulley 3 and the smaller diameter pulley 7 as shown in FIG. 1, the shutter shaft 5 rotates at a rate of 18.5 revolutions per second and, when the belt 11 is transferred to the larger diameter pulley 6, the rate of rotation of the shutter shaft 5 is reduced to 17.5 revolutions per second. It is thus possible to selectively advance the film at a rate of either 17.5 or 18.5 frames per second depending on which of the pulleys 6 and 7 has the belt trained thereover. This applies to projectors which project the film at a rate of 18 frames per second. Generally, in the case of projectors projecting the film at a rate of N frames per second, the pulleys 6 and 7 are designed such that the shutter shaft 5 can be rotated alternately at (N+0.5) revolutions and (N−0.5) revolutions per minute.

The film 13 is lightly pressed, by a pressing plate 14, against an aperture plate (not shown) which is positioned to maintain contact with the rear surface of the film. The image on the film is projected onto the screen through a light transmitting window or aperture 15 in pressing plate 14 and a projection lens (not shown) mounted beyond the aperture 15.

After passing through the aperture section, the film 13 passes through a sound reproducing section 17, after forming a loop 16 below the pressing plate 14, and moves in the direction of a takeup reel (not shown). The sound reproducing section 17 comprises a sound drum 19, a magnetic reproducing head 18 engaging the film trained around drum 19, a capstan pressing against the circumference of drum 19, with the film being interposed therebetween, for driving drum 19 in the direction of the arrow, and a pair of rollers 21 and 22 for suitably tensioning the film which moves while being pressed against the drum 19.

The capstan 20 is firmly fixed to a shaft 24 secured to a flywheel 23 which is driven in the direction of the arrow by an endless belt 26, of circular section, trained about the pulley 4 and the flywheel 23 through an intermediate pulley 25. The capstan 20 cooperates with the drum 19 to advance the film at a rate of 18 frames per second. The film, which moves while being pressed against the drum 19, must continuously move smoothly. The provision of the flywheel 23 ensures that the film continuously moves smoothly.

The embodiment described is shown as having a magnetic reproducing system provided with a magnetic head. It is to be understood, however, that the invention is not limited to this specific type of reproducing system, and that an optical reproducing system, using a phototransistor or other electrooptical transducer element, may be used in place of the magnetic reproducing system.

Detection means 27, having a portion curved forwardly toward the front end of the projector, is disposed behind the film loop 16. The detection means 27 is mounted at its upper end on, and suspended from, a shaft 28 extending across the width of the film and pivotally supported by a fixed part of the body of the projector. The shaft 28 is disposed in a position suitably spaced apart from the rear surface of the film 13. The detection means 27 may be permitted to depend from the shaft 28 by its own weight, but, in the present embodiment, the detection means 27 is urged by a spring 29, of weak resilient force, to press against the film loop 16 in order to prevent its unnecessary oscillation. A U-shapedd 30, for restricting the pivotal movement of the detection means 27, is disposed so as to surround an arm 27a of the detection means 27. The stop is firmly fixed to a fixed part of the body of the projector.

A light path opening and closing portion or obturator 27b, rectangular in shape and disposed at right angles to the arm 27a is connected to the lower end of the arm 27a. A condenser lens 31 and a lamp 32, serving as a light source, are disposed on one side of the light path obturator 27b and a phototransistor, cadmium sulfide, or other photoelectric element 33 is disposed on the other side thereof. The photoelectric element 33, obturator 27b, condenser lens 31 and light source 32 are positioned in alignment with one another. The light rays from the light source 32 are converged by the lens 31 to be incident on the photoelectric element 33. However, when the obturator 27b is interposed between the lens 31 and photoelectric element 33, the light from the light source 32 is cut off and prevented from being incident on the photoelectric element 33.

When the belt 11 is trained about the pulleys 3 and 7, the film is advanced at a rate of 18.5 frames per second in the film gate. This rate of movement of the film is slightly higher than the rate of movement of the film in the sound reproducing section, which is at a rate of 18 frames per second, so that the film loop 16 gradually grows in size and urges the detection means 27 to pivot in the direction of arrow b against the biasing force of the spring 29. When the increase in the size of the film loop 16 reaches a predetermined level, the detection means 27 moves a distance sufficiently large to cause obturator 27b to move away from the path of light from the light source 32, so that the light from the light source 32 is incident on the photoelectric element 33. The electrical resistance of the photoelectric element 33 is reduced when light is incident thereon, whereby the electric circuit including the photoelectric element 33 is actuated to operate a solenoid 34. The solenoid 34 is provided with a movable member 35 which can be moved such that it can shift the belt 11 transversely of its path of travel. The movable member 35 has fixed at its forward end a shifter 36 loosely holding the belt 11 at its forward end. A spring 39 is mounted between a flange 37 and an end plate 38 formed integrally with the movable member 35, for normally urging the movable member 35 away from the solenoid. When the solenoid 34 is operated, the movable member 35 is moved toward the solenoid against the biasing force of the spring 39. This causes the belt 11 to be pulled by the shifter 36 so that the belt can be shifted from the pulley 7 to the pulley 6. In order that shifting of the belt 11 may be effected smoothly, a cutout portion 40a is formed in a flange 40 forming the boundary between the two pulleys 6 and 7.

Shifting of the belt 11 from the smaller diameter pulley 7 to the larger diameter pulley 6 results in a reduction in the rate of rotation of the shutter shaft, whereby the rate of movement of the film in the film gate is reduced to 17.5 frames per second. Since this rate is lower than the gate of movement of the film in the sound reproducing section 17, the film loop, that has increased its size, beings to grow smaller gradually. When the reduction in the size of the film loop reaches a predetermined level, the detection means 27, pivoting forwardly as the size of the film loop is reduced, is disposed such that obturator 27b cuts off the light from source 32. This prevents the incidence of light on the photoelectric element 33, thereby rendering the solenoid 34 inoperative. As the solenoid is rendered inoperative, the movable member 35 is moved away from the solenoid by the biasing force of the spring 39, and the shifter 36 shifts the belt 11 from the larger diameter pulley 6 to the smaller diameter pulley 7. It will be appreciated that in the present invention, the solenoid is operated to shift the belt 11 from the pulley 7 to the pulley 6 and vice versa whenever the detection means 27 is actuated to open and close the light path in accordance with fluctuations in the size of film loop.

If the spring 29 acting on the detection means 27 is selected such that it has a very low resilient force, the force exerted on the film loop can be minimized and the detection means may be permitted to perform a predetermined action without damaging the film or deforming the film loop.

Different examples of the electric circuit including the photoelectric element 33 and solenoid 34 are shown in FIGS. 2 and 3. In FIG. 2, the photoelectric element 33 is connected in series with a relay 42 with respect to a power source 41, and the solenoid 34 is connected in parallel with the photoelectric element 33 through a normally open contact 42a of the relay 42, with respect to the power source.

As the electrical resistance of the photoelectric element 33 is reduced by the light incident thereon, the relay 42 is operated so that the contact 42a thereof is closed. Closing of the contact 42a results in the solenoid 34 being operated so as to effect shifting of the the belt 11.

The fact that the film is intermittently advanced in the film gate subjects the film loop to an oscillation of small amplitude at all times. Therefore, if obturator 27b moves in and out of the light path frequently as the increase in the size of the film pool reaches a predetermined level, a chattering phenomenon may be caused to occur in the solenoid 34. The chattering phenomenon of the solenoid 34 can be precluded if the relay 42 is prevented from responding to the frequent opening and closing of the light path. A capacitor 43 absorbs electric energy produced by the light intermittently incident on the photoelectric element 33 during a short time interval. Therefore, the provision of the capacitor 43 can prevent the relay 42 from operating each time light is incident on the photoelectric element. Thus, the relay 42 operates only when light is continuously incident on the photoelectric element 33. The time elapsing after light begins to be incident on the photoelectric element 33 till the relay 42 is operated can be controlled by suitably selecting the capacity of the capacitor 43 and the electrical resistance of the relay 42. The time of operation of the relay 42 must be selected such that the film loop does not grow excessively large or small in size.

In the example shown in FIG. 3, a transistor 44 is used in place of the relay 42, so that the switching action of the transistor can operate the solenoid 34. When the photoelectric element 33 has a high internal resistance, or no light is incident thereon, a current flows to the base of the transistor 44, so that the transistor 44 is kept in the off state and the solenoid 34 remains inoperative. However, when light is incident on the photoelectric element 33, the electrical resistance of the photoelectric element 33 is reduced, thereby turning on the transistor 44 and rendering the solenoid 34 operative. The time elapsing after light begins to be continuously incident on the photoelectric element 33 till the transistor 44 is turned on may be varied depending on the product of the capacity of the capacitor 43 and the resistance of a resistor 45 or the time constant thereof. In FIGS. 2 and 3, like reference characters designate similar parts.

In the embodiment of FIG. 1, it is possible to detect fluctuations in the size of the film loop only when the film is advanced in the normal direction. The embodiment of FIG. 4 represents an improvement in the embodiment of FIG. 1, in which fluctuations in the size of the film loop can be detected when the film is advanced both in the normal direction and in the reverse direction.

In the embodiment shown in FIG. 4, parts functioning in the same manner as the corresponding parts shown in FIG. 1 are designated by the reference numerals used in FIG. 1, to which 100 is added. Detailed description of these parts is omitted.

The stop 130 restricting the pivotal movement of the detection means 127 is slidably supported by a pair of stopper supporters 46 and 47 firmly fixed to a fixed part of the body of the projector, so that the stop can slide in a direction normal to the shaft 128 supporting the detection means 127. The sliding motion of stop 130 is restricted by a pair of pins 48 and 49 firmly fixed to the fixed part of the body of the projector. The stop 130 has, at its rear end, a portion 130a bent at right angles thereto 130. The bent portion of stop engages an offset portion 51a of a cam plate 51, so that the bent portion can be moved rearwardly against the biasing force of a spring 50 urging stop 130 in the direction of arrow c. The cam plate 51 is firmly secured to a shaft 54 for operating a switch 53 for changing the directions of rotation of the electric motor 101. The cam plate 51 is formed with another offset portion 51b disposed in a position diametrically opposed to the position of offset portion 51a. A bent portion 56a, disposed at the rear end of a sliding member 56 having a cam 55 firmly fixed to its forward end, abuts against the offset portion 51b of the cam plate 51, since the sliding member 56 is urged by a spring 57 in the direction of arrow d. The roller 122 pressing against the guide roller 121, with the film 113 being interposed between the two rollers so as to suitably tension the film, is rotatably supported by a shaft 60 fixed to the free end of an arm 59 pivotally mounted at its base by a shaft 58 mounted on a fixed part of the body of the projector. A connecting member 61 is supported for vertical reciprocation elevational motion by a supporting member 62 firmly fixed to a fixed part of the body of the projector. The member 61 has an upper end portion 61a which extends through the arm 59 at right angles thereto. The connecting member 61 has a lower end portion 61b which is bent at right angles with respect to the connecting member 61 and disposed above the upper edge of the cam 55. The connecting member 61 is urged downwardly by the biasing force of a spring 63, thereby causing the roller 122 to press against the roller 121 with the film 113 being interposed between the two rollers. The upper edge of the cam 55 includes a higher level portion 55a and a lower level portion 55b. When the lower bent portion 61b of the connecting member 61 is disposed above the lower level portion 55b of the cam 55, the lower bent portion 61b is spaced apart from the lower level portion 55b. However, when the cam moves in the direction opposite to the direction of arrow d, the lower bent portion 61b engages a beveled portion 55c interposed between the lower and upper level portions 55b and 55a, and moves into engagement with the higher level portion 55a.

The end portion of the shaft 54 for operating the switch 53 projects outwardly of the projector. If the knob mounted on the end of the shaft 54 is operated manually to rotate the shaft 54 in the direction of arrow e, the electric motor 101 is energized for rotation in the reverse direction.

If the electric motor 101 is actuated with the switch 53 set for normal operation, as shown in FIG. 4, the film 113 is intermittently advanced in the film gate to move downwardly, and continuously moved in the sound reproducing section 117 in the same manner as in the embodiment shown in FIG. 1. The sound reproducing head of the sound reproducing section is omitted from the figure. The belt 111 is trained about the pulley 103 and the larger diameter pulley 106, so that the rate of film movement in the film gate is lower than the rate of film movement in the sound reproducing section. Therefore, the film loop 116 gradually begins to grow smaller in size and the detection means 121, lightly pressing against the film loop 116, begins to pivot in the direction of the arrow $f$, following the movement of the film loop 116. When the reduction in the size of the film loop 116 reaches a predetermined level, obturator 127b moves out of alignment with the light path between the light source 132 and photoelectric element 133, permitting the light from the light source 132, passing through the lens 131, to be incident on the photoelectric member 133. The solenoid 134 is controlled by an electric circuit (subsequently to be described) such that it is rendered operative only when no light is incident on the photoelectric element. Therefore, the solenoid 134 is rendered inoperative upon incidence of light on the photoelectric element, so that the shifter 136 is moved away from the solenoid 134 by the biasing force of the spring 139. This causes the belt 111 to be shifted from the larger diameter pulley 106 to the smaller diameter pulley 107, thereby increasing the rate of film movement in the film gate relative to the rate of film movement in the sound reproducing section. The film loop 116 begins to grow larger in size. As the increase in the size of film loop reaches a predetermined level, obturator 127b of the detection means 127 is brought into alignment with the light path between the light source 132 and photoelectric element 133, thereby cutting off the light incident on the photoelectric element 133. This renders the solenoid 134 operative again, so that the belt 111 is shifted from the smaller diameter pulley 107 to the larger diameter pulley 106.

If the shaft 54 for operating the switch 53 is rotated in the direction of arrow $e$, the electric motor 101 begins to rotate in the reverse direction, so that the film 113 is advanced in the reverse direction, or upwardly in the film gate. At the same time, the bent portion 130a of stop 130 is pulled by the offset portion 51a of the cam plate 51, against the biasing force of the spring 50, and the bent portion 56a of the sliding member 56 is pushed by the offset portion 51b of the cam plate 51, against the biasing force of the spring 57, whereby stop 130 moves in a direction opposite to the direction of arrow $c$ and the sliding member 56 moves in a direction opposite to the direction of arrow $d$. As the sliding member 56 moves in the direction opposite to the direction of arrow $d$, the lower bent portion 61b of the connecting member 61 rides on the higher level portion 55a of the cam 55, thereby moving the connecting member 61 upwardly. This causes the arm 59 to pivot upwardly about the shaft 58, so that the roller 122 is moved upwardly apart from the roller 121 to release the film from engagement with the rollers 121 and 122. Movement of stop 130 in the direction opposite to the direction of arrow $c$ results in the U-shaped forward end portion 130b moving to a position indicated by broken lines 130bA in FIG. 5, thereby increasing the limit of pivotal movement of the detection means 127 in the counterclockwise direction about the shaft 128.

In FIG. 4, the rate of film movement in the film gate is lower than the rate of film movement in the sound reproducing section when the belt 111 is trained about the pulley 103 and the larger diameter pulley 106, so that the film loop begins to grow in size if the film is advanced in the reverse direction. When the increase in the size of the film loop 116 reaches a predetermined level, as shown in broken lines 116A in FIG. 5, the detection means 127 is moved by the rear surface of the film loop 116 to pivot in the clockwise direction about the shaft 128 into a position shown in broken lines 127A. This brings the obturator 127b out of alignment with the light path between the light source 132 and photoelectric element 133, thereby permitting the light from the light source 132 to be incident on the photoelectric element 133. Upon incidence of light on the photoelectric element 133, the solenoid 134 is rendered inoperative. This causes the belt 111 to be shifted from the larger diameter pulley 105 to the smaller diameter pulley 107, whereby the rate of film movement in the film gate is increased over the rate of film movement in the sound reproducing section. An increase in the rate of film movement in the film gate causes the film loop to begin to grow smaller in size. As the film loop 116 beings to grow smaller in size, the detection means 127 begins to return from the position shown in the broken lines 127A to its original position. When the reduction in the size of the loop reaches a predetermined level, the light path opening and closing or obturator 127b is brought into alignment with the light path between the light source 132 and photoelectric element 133, thereby preventing the light from the light source 132 from being incident on the photoelectric element 133. This renders the solenoid 134 operative again, thereby shifting the belt 111 from the smaller diameter pulley 107 to the larger diameter pulley 106.

It will be appreciated from the foregoing description that, when the film is advanced in the reverse direction, the device according to this invention can be made to operate satisfactorily by increasing the range of pivotal movement of the detection means 127 in only one direction. To attain this end, stop means associated with film movement direction switch means is used in this embodiment to vary the position of stop 130 with respect to the detection means. Alternatively, the signal producing means, comprising the light source 132, condenser lens 131 and photoelectric element 133, may be coupled to the film movement direction switch means so that the signal producing means can vary its position. In order to cause the signal producing means to vary its position, the U-shaped front end portion 130b shown in FIG. 4 is dissociated from stop 130 and firmly fixed to a fixed part of the body of the projector. A base 64 for supporting the signal producing means is made movable in a direction normal to the optical axis of the lens 131. The base 64 is connected to the operating shaft 54, so that the base 64 can be moved to the right, as seen in FIG. 4, when the projector is switched to reverse operation of the film. If the base 64 is connected to the sliding member 56, it is possible to move the base 64 to the right, or in a direction opposite to the direction of arrow $d$, when the switch is actuated to advance the film in the reverse direction. If the base 64 is moved to the right, the light path is displaced to the right with respect to the obturator 127b in FIG. 5. This causes the light from the light source 132 to be incident on the photoelectric element 133, thereby rendering the solenoid inoperative and shifting the belt 111 from the larger diameter pulley 106 to the smaller diameter pulley 107. This results in an increase in the rate of film movement in the film gate causing the film loop 116 to begin to grow smaller in size. As the film loop 116 grows smaller in size, the detection means 127 pivots in the counterclockwise direction in FIG. 5, and the light path opening and closing portion 127b is brought into alignment with the light path, which has been displaced to the right as aforementioned. This renders the solenoid 134 operative again, so that the belt 111 is shifted from the smaller diameter pulley 107 to the larger diameter pulley 106.

In the present invention, either the stop, for controlling the pivotal motion of the detection means 127, or the signal producing means cooperating with the detection means, 127, may be moved to make the film movement rate equalizing device according to this invention operate satisfactorily when the film is advanced in the reverse direction. The use of movable signal producing means requires assembling of the light source 132, condenser lens 131 and photoelectric element 133 as a unit. FIG. 6 shows an example of the signal producing means assembled as a unit. The photoelectric element 133 is fitted in an opening formed in a vertical wall 64a of the base 64 and the condenser lens 131 is fitted in a cylindrical portion 64b on the base 64. The lamp or light source 132 is mounted in a lamp housing threadably connected at its opening to the cylindrical portion 64b. The base 64 may be movably supported by the body of the projector by suitable means. The obturator portion 127b of the detection means 127 is positioned between the photoelectric element and the lens 131 for pivotal motion across the optical axis of the lens 131.

If the signal producing means is not made movable, it need not be assembled as a unit. Therefore, it is not absolutely necessary to use the lamp 32 as a light source. It is possible to cause the light from the light source for projection to be incident on the photoelectric element 133 by using a fiber optical system, employing a fiber-optic bundle or the like, or a reflector system, consisting of a combination of reflectors.

FIG. 7 shows an example of the electric circuit for controlling the solenoid 134 used in the embodiment of the present invention shown in FIG. 4. As it is a conventional circuit, this circuit will be explained briefly. The photoelectric element 133 shows a high value of resistance when no light is incident thereon and shows a low value of resistance when light is incident thereon so as to control the flow of current from a power source 71. A capacitor 70 is utilized for the purpose of preventing a chattering phenomenon, as is the case with capacitor explained with reference to FIG. 2. A Schmidt circuit is formed by transistors 66 and 67 each having a constant established by suitable means. It is particularly advantageous, in preventing the chattering phenomenon, to select the constant of the transistor 66 such that there is a great difference between the input voltage for turning the transistor on and the input voltage to turn the transistor off. Transistors 68 and 69 serve as rectifying amplifiers and function such that they supply or cut off a current to the solenoid 134 in accordance with the collector voltage of the transistor 67. A DC power source 71 is a cell or a rectified and smoothed AC power source.

When no light is incident on the photoelectric element 133, the transistor 66 is in the off state, transistor 67 is in the on state and transistors 68 and 69 are in the on state, so that the solenoid is rendered operative. Upon incidence of light on the photoelectric element 133, the states of the transistors, as stated above, are reversed, thereby rendering the solenoid 134 inoperative. If solenoid 134 is rendered operative, the belt 111 is shifted from the smaller diameter pulley 107 to the larger diameter pulley 106, and, if the solenoid 134 is rendered inoperative, the belt 111 is shifted from the larger diameter pulley 106 to the smaller diameter pulley 107, as explained previously.

While the present invention has been described with reference to preferred embodiments thereof, it is to be understood that the invention has been shown and described for the purpose of illustration only, and that the invention is not intended to be limited thereto. Many changes and modifications may be made by one having an ordinary skill in the art without departing from the spirit and scope of the invention, in putting the invention into practice.

We claim:

1. A film movement rate equalizing device, for sound projectors having a film gate, for film projection, and a sound reproducing section, said device comprising, in combination, film advance means operable to step the film through said film gate selectively at a first rate, slightly higher than the rate of film movement in said sound reproducing section, or at a second rate, slightly lower than the rate of film movement in said sound reproducing section; film advance rate switching means, operable to switch said film advance means between said first and second rates; signal means controlling rate switching operation of said rate switching means; detecting means movable in accordance with fluctuations in the size of a film loop formed between said film gate and said sound reproducing section, resulting from differences between the rate of film movement through said film gate and the rate of film movement in said sound reproducing section, and operatively associated with said signal means to effect actuation of said signal means, responsive to a detected predetermined fluctuation in the film loop size, to control said rate switching means to switch said film advance means from one said rate to the other said rate; and stop means limiting movement of said detecting means.

2. A film movement rate equalizing device for sound projectors, as claimed in claim 1, in which said film advance means includes a shutter shaft forming part of a sound projector; two driven pulleys, of respective different diameters, fixed to said shaft in axially juxtaposed relation; shutter shaft driving means including a drive pulley; and a belt trained around said drive pulley and one of said driven pulleys; said film advance rate switching means being operatively associated with said belt and effective, under the control of said signal means, to switch said belt from one driven pulley to the other driven pulley and vice versa.

3. A film movement rate equalizing device for sound projectors, as claimed in claim 2, in which said driving means is an electric motor.

4. A film movement rate equalizing device for sound projectors, as claimed in claim 1, in which said signal means includes a photoelectric element and a light source having a light path therebetween; said detecting means including a light path obturator controlling incidence of light from said light source along said light path unto said photoelectric element.

5. A film movement rate equalizing device for sound projectors, as claimed in claim 4, in which said film advance means is selectively operable to step the film through said film gate in either of two opposite directions; film movement direction switch means operatively connected to said film advance means to selectively change the direction of film feed through said film gate; said stop means being mounted for displacement transversely of said light path to displace the range of movement of said detecting means transversely of said light path; and stop shifting means operatively associated with said film movement direction switch means to displace said stop means in accordance with the direction of film feed through said film gate; the displacing of the range of movement of said detecting means transversely of said light path effecting actuation of said signal means by said detecting means in a manner such that, when the film is moved through the film gate in the reverse direction, the rate of movement of the film, as varied between said first and second rates, is varied in a manner reversed from that in which the rate of movement of the film, as varied between said first and second rates, is varied when the film is advanced in the normal direction through said film gate.

6. A film movement rate equalizing device for sound projectors, as claimed in claim 4, in which said film advance means is selectively operable to step the film through said film gate in either of two opposite directions; film movement direction switch means operatively associated with said film advance means to switch the direction of movement of film through said film gate from the normal direction to the reverse direction and vice versa; said signal means being mounted for displacement, relative to the range of movement of said detecting means, transversely of said light path; and shifting means operatively associated with said film movement direction switch means and with said signal means and operable to shift said signal means in accordance with the selective direction of film movement through said film gate; the relative position of said signal means with respect to said detecting means, with a selected direction of movement through said film gate, being such that, when the film is advanced in a reverse direction through said film gate, the rate of movement of the film, as varied between said first and second rates, is varied in a manner which is the reverse of the manner in which the rate of movement of the film is varied, between said first and second rates, when the film is advanced in the normal direction through said film gate.

7. A film movement rate equalizing device for a sound projector as defined in claim 4, in which said detection means has an upper end pivotally supported by a shaft disposed behind said film loop, said detection means having an intermediate portion disposed between said upper and said light path obturator and curved forwardly whereby the detection means can be swung forwardly by the curved surface of the film loop.